United States Patent [19]

Muths et al.

[11] Patent Number: 5,963,860
[45] Date of Patent: Oct. 5, 1999

[54] METHOD AND SYSTEM FOR TRANSMITTING A DATA COMMUNICATION FROM A CALLING COMMUNICATION UNIT ASSOCIATED WITH A WIRELESS COMMUNICATION SYSTEM TO A CALLED COMMUNICATION UNIT

[75] Inventors: Timothy J. Muths, Keller; Steven T. Barrett, Grapevine, both of Tex.

[73] Assignee: Motorola, Inc., Schaumburg, Ill.

[21] Appl. No.: 08/954,345

[22] Filed: Oct. 17, 1997

[51] Int. Cl.⁶ .......................... H04M 11/10; H04M 1/00
[52] U.S. Cl. .................. 455/412; 455/517; 455/561; 455/445; 370/428
[58] Field of Search ............................... 455/422, 445, 455/450, 434, 515, 557, 560, 561, 412, 517; 375/222; 370/400, 428, 342

[56] References Cited

U.S. PATENT DOCUMENTS

| | | | |
|---|---|---|---|
| 5,519,699 | 5/1996 | Ohsawa | 370/428 |
| 5,555,447 | 9/1996 | Kotzin et al. | 455/72 |
| 5,559,797 | 9/1996 | Murase | 370/428 |

OTHER PUBLICATIONS

John D. Spragins et al, "Telecommunications Protocols and Design ", pp. 95–105, Jul. 1992.

*Primary Examiner*—Nguyen Vo
*Attorney, Agent, or Firm*—Heather L. Creps; Mario J. Donato, Jr.

[57] ABSTRACT

The method includes establishing a first data channel (16) between the calling communication unit (44) and the wireless communication system (40), the first data channel configured to receive and transmit the data communication (21); after establishing the first data channel and before a second data channel (22) has been established between the wireless communication system and the called communication unit (84), receiving by the calling communication unit a message (19), the message indicating that the second data channel has been established; and based on the message, the calling unit transmitting the data communication via the first data channel.

19 Claims, 3 Drawing Sheets

METHOD AND SYSTEM FOR TRANSMITTING A DATA COMMUNICATION FROM A CALLING COMMUNICATION UNIT ASSOCIATED WITH A WIRELESS COMMUNICATION SYSTEM TO A CALLED COMMUNICATION UNIT

This application is related to co-pending application Ser. No. 08/953,125 TBA, entitled METHOD AND SYSTEM FOR TRANSMITTING DATA TO A MOBILE COMMUNICATION UNIT, filed on Oct. 17, 1997, commonly assigned with the present application.

FIELD OF THE INVENTION

This invention relates generally to wireless communication systems, and, more particularly, to a method and system for transmitting a data communication from a calling communication unit associated with a wireless communication system to a called communication unit.

BACKGROUND OF THE INVENTION

In a typical wireless communication system such as a cellular radio frequency (RF) radiotelephone system, a radio subsystem including a base station system having a controller and a plurality of transmitters and receivers is in communication with a switching center. An interworking unit is often in communication with one or more elements of the radio subsystem. The radio subsystem is responsive to a mobile communication unit, or station, operating within an area served by the base station system.

Multiple access wireless communication between the radio subsystem and the mobile station occurs via RF channels which provide physical paths over which digital communication signals such as voice and data are transmitted. A wireless communication system using code division multiple access (CDMA) channelization is described in detail in standards promulgated by the Electronics Industries Association (EIA) and the Telecommunications Industry Association (TIA), such as TIA/EIA Interim Standard 95 (IS-95), IS-95A and IS-96, each such standard incorporated herein by reference.

To facilitate the wireless transfer of a data communication, many mobile stations are capable of receiving or transmitting digital data from/to computers, facsimile machines and other data sources.

FIG. 1 illustrates a typical call setup procedure for a data communication, such as a facsimile communication, in code division multiple access (CDMA) system. First, a mobile station 44 sends a request for a data communication 10 to a radio subsystem 46. Request 10 may be made via an air interface protocol such as IS-95. Radio subsystem 46 then requests a data circuit 12 in an interworking unit 56, which may include one or more modems (not shown). Request 12 may be implemented using IS-687 protocol, providing for the setting up and tearing down of a data circuit between a radio subsystem and an interworking unit in a cellular communication system.

Next, mobile station 44 and interworking unit 56 exchange commands and data to establish a first data channel 16 (i.e., a mobile station path or data circuit) such as a communication protocol stack. A suitable stack may be established using IS-99 protocol, for example. It is then possible for mobile station 44 and interworking unit 56 to exchange commands and responses 18 to configure a modem (not shown) associated with interworking unit 56 based on the requirements of mobile station 44. One or more commands and responses 18 may be performed to properly configure the modem. Examples of commands and responses 18 include, but are not limited to, baud rate instructions and carrier detect timeout instructions and other commands and responses as defined in IS-99, incorporated herein by reference.

At this point, it is generally necessary to establish a second data channel 22, such as a PSTN data circuit, to provide connection from mobile station 44 to a called device (not shown) such as a landline facsimile machine or computer. Steps involved in establishing a PSTN data circuit are well-known, and may include but are not limited to: establishing a landline data circuit between the radio subsystem and/or modem and the PSTN; dialing a number associated with the called device; and waiting for the called device to answer. In addition, prior to initiation of data communication 30, modem negotiation 26 may be performed according to well-known methods.

To indicate that second data channel 22 has been established and modem negotiation is complete, a message, such as connect message 28, is directed to mobile station 44 via the first data channel. Once connect message 28 has been received by mobile station 44, data communication 30 may commence.

It can be seen that the traditional manner of transmitting data communication 30 suffer from various problems. For example, valuable RF resources may be usurped by waiting for the establishment of second data channel 22 while no data transfer is being accomplished by mobile station 44, and the total time required to transmit data communication 30 may be increased.

There is therefore a need for a method and system for transmitting a data communication from a communication unit such as a mobile station associated with a wireless communication system to a called communication unit which minimizes an amount of time needed to complete the data communication.

SUMMARY OF THE INVENTION

According to an aspect of the present invention, the foregoing needs are addressed by a method for transmitting a data communication from a calling communication unit associated with a wireless communication system to a called communication unit, including: establishing a first data channel between the calling communication unit and the wireless communication system, the first data channel configured to receive and transmit the data communication; prior to establishing a second data channel between the wireless communication system and the called communication unit, transmitting the data communication via the first data channel; buffering the data communication by the wireless communication system; after buffering, establishing the second data channel, the second data channel configured to receive and transmit the data communication; and transmitting the buffered data communication by the second data channel.

According to another aspect of the present invention, a method for transmitting a data communication from a calling communication unit associated with a wireless communication system to a called communication unit includes: establishing a first data channel between the calling communication unit and the wireless communication system, the first data channel configured to receive and transmit the data communication; after establishing the first data channel and before a second data channel has been established between the wireless communication system and the called communication unit, receiving by the calling communication unit a simulated connect message, the message indicating that the second data channel has been established; and based on the simulated connect message, the calling unit transmitting the data communication via the first data channel.

According to still another aspect of the present invention, a system for transmitting a data communication from a calling communication unit associated with a wireless communication system to a called communication unit associated with a landline communication system includes: a first data channel established between the calling communication unit and the wireless communication system, the first data channel configured to receive and transmit the data communication; a second data channel established between the wireless communication system and the called communication unit, the second data channel configured to receive and transmit the data communication; and an interworking unit associated with the wireless communication system, the interworking unit sending a simulated connect message to the calling communication unit after the establishment of the first data channel and prior to the establishment of the second data channel, the simulated connect message indicating that the second data channel has been established and the simulated connect message directing the calling communication unit to transmit the data communication via the first data channel.

Advantages of the present invention will become readily apparent to those skilled in the art from the following description of the preferred embodiment(s) of the invention which have been shown and described by way of illustration. As will be realized, the invention is capable of other and different embodiments, and its details are capable of modifications in various respects. Accordingly, the drawings and description are to be regarded as illustrative in nature, and not as restrictive.

DETAILED DESCRIPTION OF THE PREFERRED EMBODIMENTS

Figure 2:
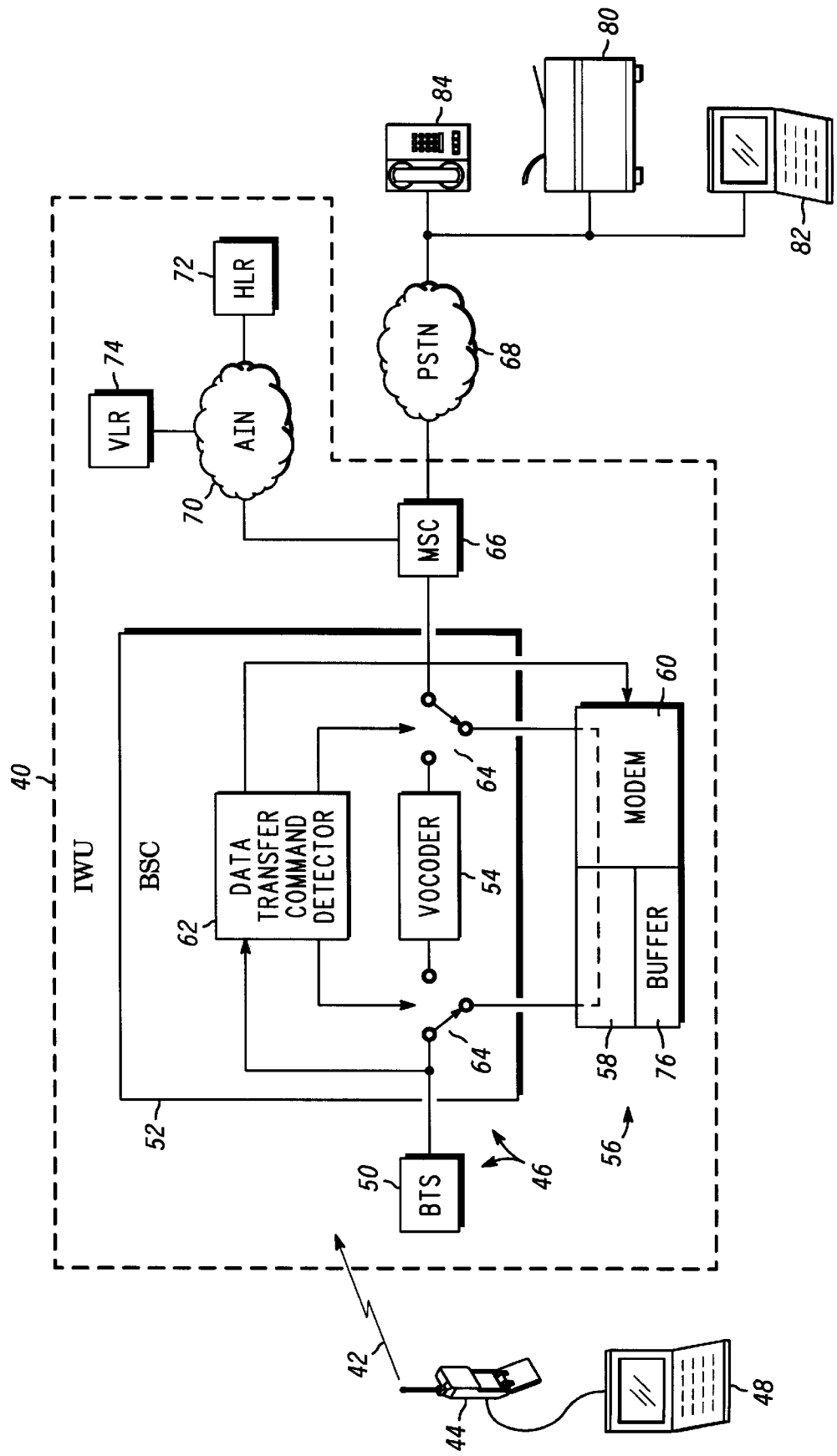
FIG. 2 is a block diagram of a wireless communication system for transmitting a data communication from a calling communication unit to a called communication unit in accordance with a preferred embodiment of the present invention.

Turning now to the drawings, wherein like numerals designate like components, FIG. 2 is a block diagram of a wireless communication system 40 for transmitting a data communication from a calling communication unit to a called communication unit in accordance with a preferred embodiment of the present invention.

A mobile communication unit 44, or mobile station, which as shown is coupled to a data source 48 such as a computer, facsimile machine, personal digital assistant or other device, is responsive to a wireless communication system 40.

Multiple access wireless communication between a base transceiver station (BTS) 50 and mobile station 44 occurs via radio frequency (RF) channels which provide physical paths over which digital communication signals such as voice, data, video and other information are transmitted. Base-to-mobile station communications are said to occur on a forward-link channel, while mobile-to-base station communications are referred to as being on a reverse-link channel. As shown, communication signal 42 has been transmitted via a reverse-link channel such as a traffic channel by mobile station 44 to BTS 50.

BTS 50 is coupled to a base station controller (BSC) 52. Additional base transceiver stations (not shown) may also be coupled to BSC 52. Collectively, BTS 50 and BSC 52 may be referred to as a base station system. BSC 52 includes, among other things, a data transfer command detector 62, which may examine communication signal 42 from mobile station 44 to determine, according to well-known methods, whether signal 42 should be routed through vocoder 54 or interworking unit 56.

Vocoder 54 functions in a well-known manner to convert voice information received from mobile station 44 via base transceiver station 50 into pulse code modulation (PCM) data.

Interworking unit 56 typically includes a microprocessor or computer 58 and one or more modems 60. As shown, a buffer 76, which may be any suitable type of memory, is part of interworking unit 56. Buffer, however, may be located in, or associated with, any element of wireless communication system 40. Buffer 76 functions to keep track of an amount of data received in a particular data communication, and to track an amount of data forwarded in a particular communication. Various well-known buffering methods may be employed for these purposes.

BSC 52 is in turn coupled to a mobile switching center (MSC) 66, which connects communication channels established between mobile station 44 and the base station system with selected wirelines associated with public switched telephone network (PSTN) 68 or with other network connections such as connections in advanced intelligent network (AIN) 70. Wireline connections between MSC 66 and PSTN 68 or AIN 70 may in fact be trunks. Additional base station systems (not shown) may also be coupled to MSC 66.

A channel such as a data channel may be established via PSTN 68, between wireless communication system 40 and called device 84, which may be a telephone, facsimile machine, computer, or other type of device capable of receiving data.

AIN 70 may be associated with wireless communication system 40 or with another wireless communication system or with another type of system altogether. As shown, AIN 70 is in communication with home location register (HLR) 72 and with visitor location register (VLR) 74, which generally serve as repositories for mobile station information, such as preferences, registration and user profiles and other information associated with individual mobile stations. Communications with and between elements of AIN 70 may occur by way of a protocol such as Interim Standard 41, published by the Telecommunications Industry Association, Washington, D.C., or via another suitable protocol, such protocols being commonly known.

Figure 1:
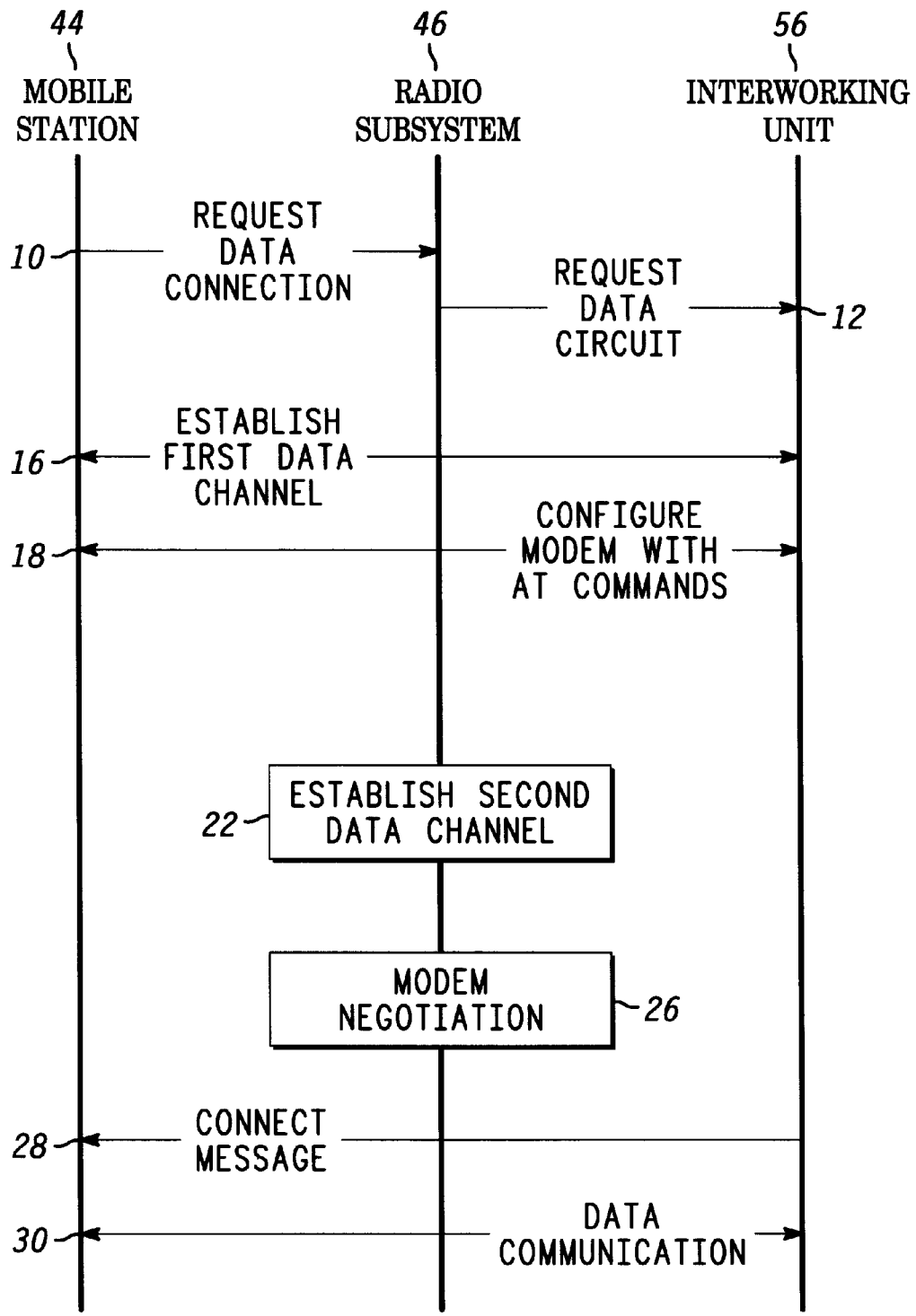
FIG. 1 is a call flow diagram illustrating a typical call setup procedure for a data communication in code division multiple access (CDMA) system.
Figure 3:
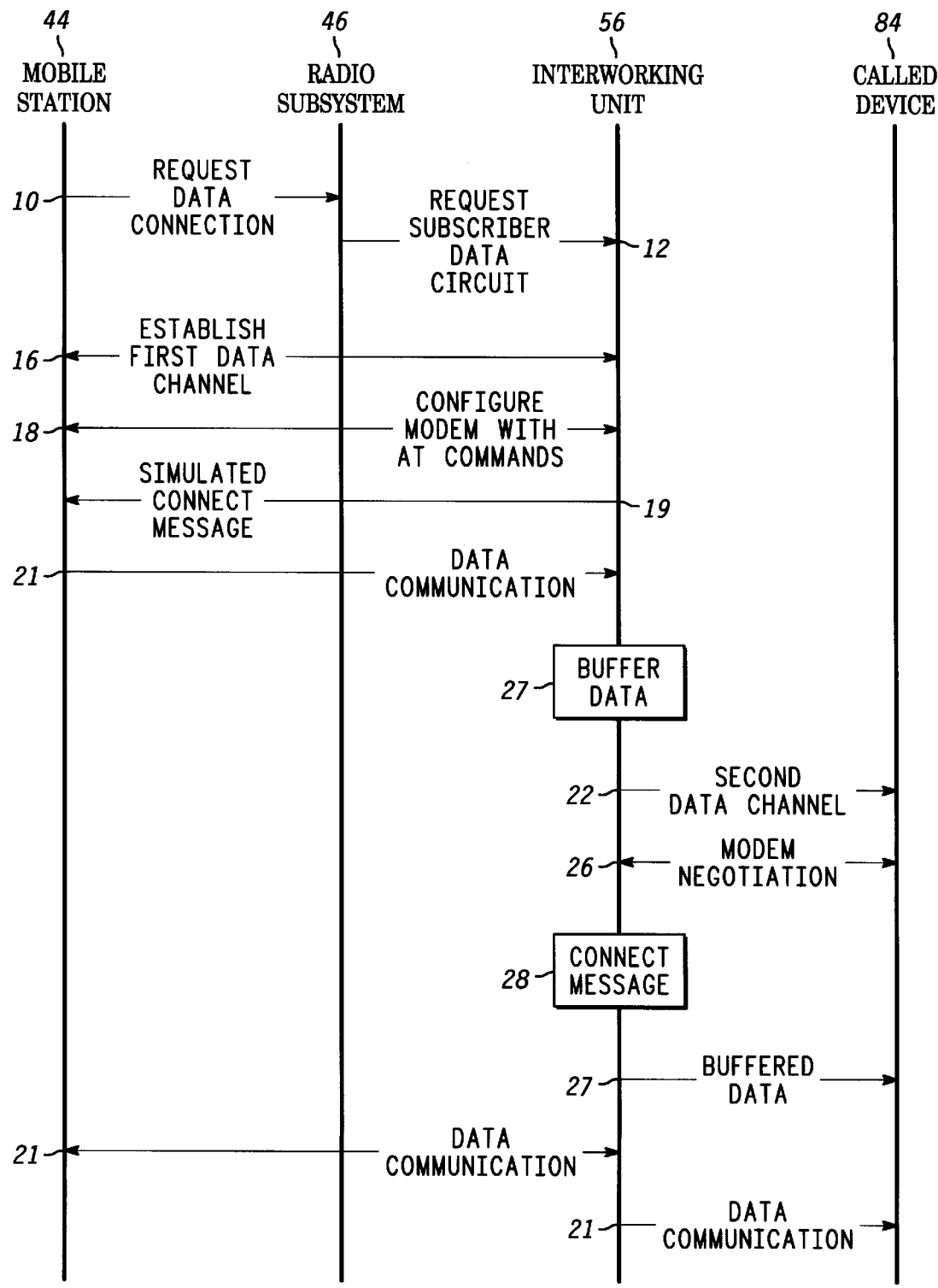
FIG. 3 is a call flow diagram illustrating a call setup procedure for a data communication according to a preferred embodiment of the present invention.

FIG. 3, with reference to FIGS. 1 and 2 where appropriate, is a call flow diagram illustrating a call setup procedure for a data communication according to a preferred embodiment of the present invention. First, mobile station 44 sends a request for a data communication 10 to radio subsystem 46, which may include BTS 50 and/or BSC 52. Request 10 may be made via an air interface protocol such as IS-95.

Radio subsystem 46 then requests data circuit 12 in interworking unit 56, which may include a request for one or more modems 60. Request 12 may be implemented using IS-687 protocol, providing for the setting up and tearing down of a data circuit between a radio subsystem and an interworking unit in a cellular communication system.

Next, mobile station 44 and interworking unit 56 exchange commands and data to establish first data channel 16 (i.e., a mobile station data circuit or mobile path) such as a data communication protocol stack. A suitable stack may be established using IS-99 protocol, for example. It is then possible for mobile station 44 and interworking unit 56 to exchange commands and responses 18 to configure a modem associated with interworking unit 56 based on the requirements of mobile station 44. One or more commands and responses 18 may be performed to properly configure the modem. Examples of commands and responses 18 include, but are not limited to, commands supported by IS-99, such as baud rate instructions and carrier detect timeout instructions.

At this point, prior to establishing second data channel 22, which may be a PSTN path between wireless communication system 40 and called device 84, interworking unit 56 directs a message, such as simulated connect message 19, to mobile station 44. In response to simulated connect message 19, mobile station 44 begins to transmit data communication 21 to wireless communication system 40. While second data channel 22 and modem negotiation 26 are being performed, data communication 21 is preferably stored temporarily in buffer 76.

When second data channel 22 has actually been established and modem negotiation 26 is complete, interworking unit 56 receives connect message 28, but does not forward message 28 to mobile station 44. Once connect message 28 has been received by interworking unit 56, however, that portion 27 of data communication 21 stored in buffer 76 may be forwarded to called device 84. In addition, data communication 21, if not completed, may continue directly to called device 84 over both the first and second data channels.

Thus, the systems and methods of the present invention result in less air time usurped by mobile station 44, because mobile station 44 may transmit data communication 21 prior to the establishment of a connection with called device 84. The present invention may also result in better utilization of valuable traffic channel resources.

CDMA cellular communication systems have been referred to herein, but the present invention is applicable to any communication system, and the systems and methods described herein may be used independent of RF technology. Examples of other suitable types of communication systems include but are not limited to analog communication systems such as the total access communication system (TACS), and digital communication systems such as groupe special mobile (GSM), a European time division multiple access (TDMA) system, pacific digital cellular (PDC), a Japanese TDMA system. Further, any communication system protocols are suitable for use with the systems and methods of the present invention, such as Electronics Industries Association 553 (EIA-553) and Interim Standard 54 (IS-54), among others.

The principles of the present invention which apply to cellular-based communication systems and/or landline-based based communication systems may also apply to other types of communication systems, including but not limited to wireless local loop communication systems, personal communication systems, trunked systems, satellite communication systems and data networks. Likewise, the principles of the present invention which apply to all types of radio frequency channels also apply to other types of communication channels, such as electronic data buses, wireline channels, optical fiber links and satellite links.

It will be apparent that other and further forms of the invention may be devised without departing from the spirit and scope of the appended claims and their equivalents. It will also be understood that this invention is not to be limited in any manner to the specific embodiments described above, but will only be governed by the following claims and their equivalents.

We claim:

1. A method for transmitting a data communication from a calling communication unit associated with a wireless communication system to a called communication unit, the method comprising:

establishing a first data channel between the calling communication unit and the wireless communication system, the first data channel configured to receive and transmit the data communication;

directing a simulated connect message to the calling communication unit, the simulated connect message indicating that a second data channel has been established;

prior to establishing the second data channel between the wireless communication system and the called communication unit, transmitting the data communication via the first data channel;

buffering the data communication by the wireless communication system;

after buffering, establishing the second data channel, the second data channel configured to receive and transmit the data communication; and transmitting the buffered data communication by the second data channel.

2. The method according to claim 1, wherein the wireless communication system comprises a code division multiple access (CDMA) communication system.

3. The method according to claim 1, wherein the data communication comprises a facsimile data transmission.

4. The method according to claim 1, wherein the wireless communication system comprises:

a switching center in communication with a base station system; and an interworking unit responsive to the base station system and the switching center.

5. The method according to claim 4, wherein the interworking unit comprises a modem.

6. The method according to claim 4, wherein the step of buffering the data communication by the wireless communication system comprises buffering the data communication by the interworking unit.

7. The method according to claim 4, further comprising:

after the first data channel is established and prior to the establishment of the second data channel, the interworking unit directing the simulated connect message to the calling communication unit, the simulated connect message indicating that the second data channel has been established; and based on the simulated connect message, the calling unit transmitting the data communication via the first data channel.

8. The method according to claim 4, wherein the step of establishing the first data channel comprises:

establishing a radio frequency communication path between the calling communication unit and the base station system;

establishing a circuit mode connection between the base station system and the interworking unit; and establishing a communication protocol between the calling communication unit and the interworking unit.

9. The method according to claim 4, wherein the step of establishing the second data channel comprises:

establishing a circuit mode connection between the interworking unit and the switching center;

contacting the called communication unit; and configuring the called communication unit to receive the data communication.

10. The method according to claim 9, wherein the step of configuring the called communication unit comprises the step of configuring a modem.

11. The method according to claim 1, wherein the calling communication unit comprises a mobile communication unit.

12. The method according to claim 1, wherein the called communication unit is associated with a landline communication system.

13. The method according to claim 1, wherein the landline communication system comprises a public switched telephone network.

14. A method for transmitting a data communication from a calling communication unit associated with a wireless communication system to a called communication unit, the method comprising:

establishing a first data channel between the calling communication unit and the wireless communication system, the first data channel configured to receive and transmit the data communication;

after establishing the first data channel and before a second data channel has been established between the wireless communication system and the called communication unit, receiving by the calling communication unit a simulated connect message, the simulated connect message indicating that the second data channel has been established; and based on the simulated connect message, the calling unit transmitting the data communication via the first data channel.

15. The method according to claim 14, further comprising:

buffering the data communication by the wireless communication system;

after buffering, establishing the second data channel, the second data channel configured to receive and transmit the data communication; and transmitting the buffered data communication by the second data channel.

16. The method according to claim 15, wherein the wireless communication system comprises:

a switching center in communication with a base station system; and an interworking unit responsive to the base station system and the switching center.

17. The method according to claim 16, wherein the step of establishing the first data channel comprises:

establishing a radio frequency communication path between the calling communication unit and the base station system;

establishing a circuit mode connection between the base station system and the interworking unit; and establishing a communication protocol between the calling communication unit and the interworking unit.

18. The method according to claim 16, wherein the step of establishing the second data channel comprises:

establishing a circuit mode connection between the interworking unit and the switching center;

contacting the called communication unit; and configuring the called communication unit to receive the data communication.

19. A system for transmitting a data communication from a calling communication unit associated with a wireless communication system to a called communication unit associated with a landline communication system, comprising:

a first data channel established between the calling communication unit and the wireless communication system, the first data channel configured to receive and transmit the data communication;

a second data channel established between the wireless communication system and the called communication unit, the second data channel configured to receive and transmit the data communication; and an interworking unit associated with the wireless communication system, the interworking unit sending a simulated connect message to the calling communication unit after the establishment of the first data channel and prior to the establishment of the second data channel, the simulated connect message indicating that the second data channel has been established and the simulated connect message directing the calling communication unit to transmit the data communication via the first data channel.

* * * * *